Figure 4:
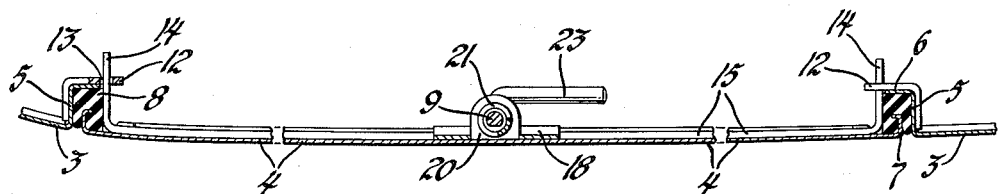

March 6, 1951 P. E. BENSON 2,544,129
WHEEL COVER
Filed June 25, 1947 3 Sheets-Sheet 1
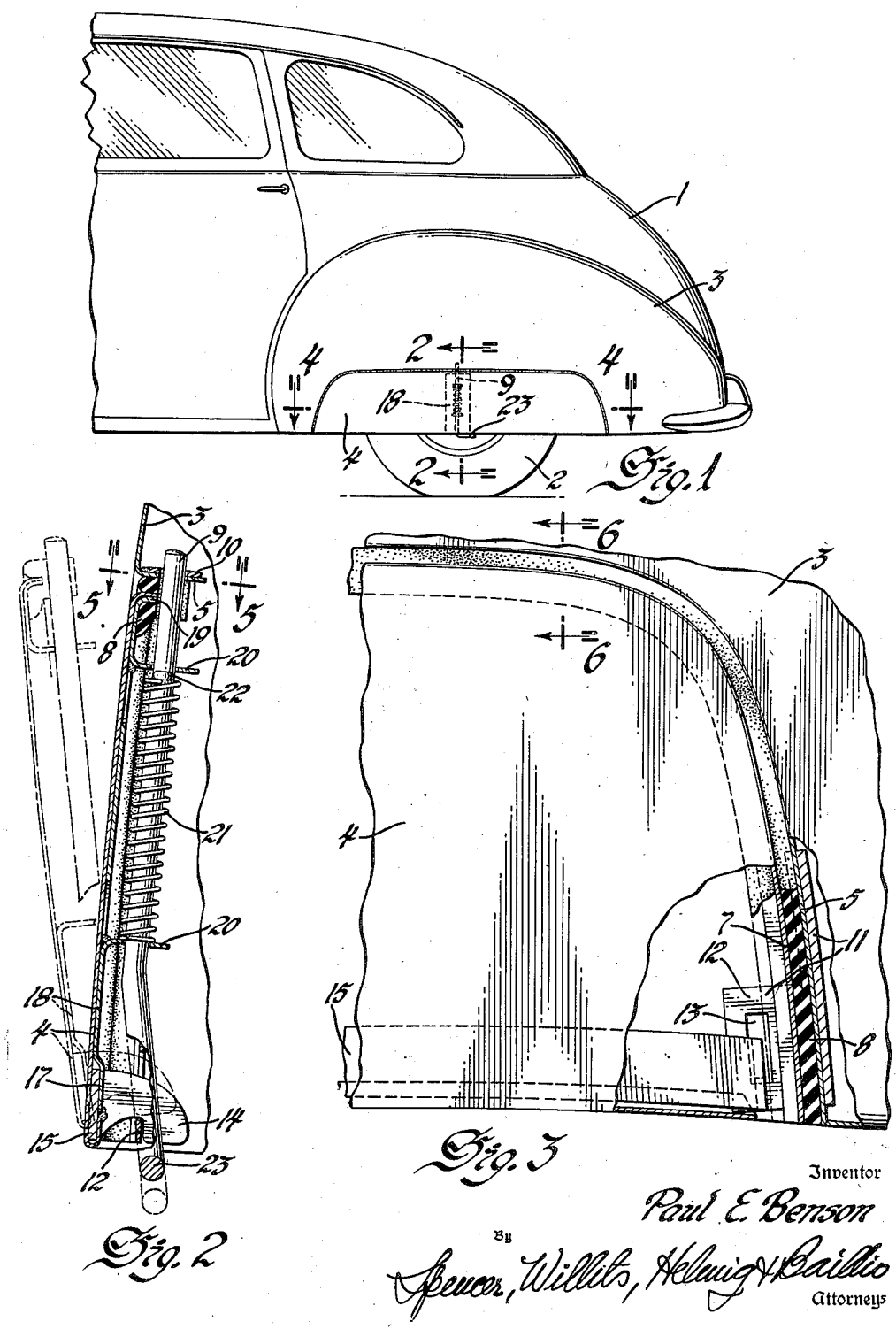
Inventor
Paul E. Benson
By Spencer, Willits, Helwig & Baillio
Attorneys March 6, 1951 P. E. BENSON 2,544,129
WHEEL COVER Filed June 25, 1947 3 Sheets-Sheet 2

Inventor
Paul E. Benson
By Spencer, Willits, Helwig & Baille
Attorneys

March 6, 1951 P. E. BENSON 2,544,129
WHEEL COVER
Filed June 25, 1947 3 Sheets-Sheet 3
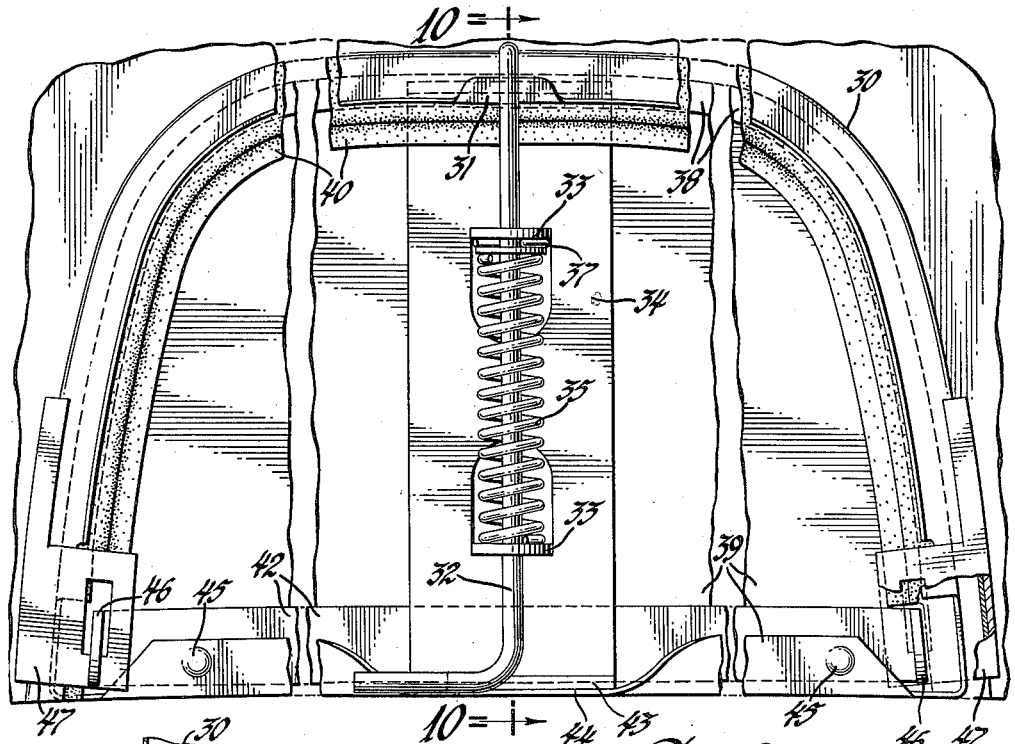
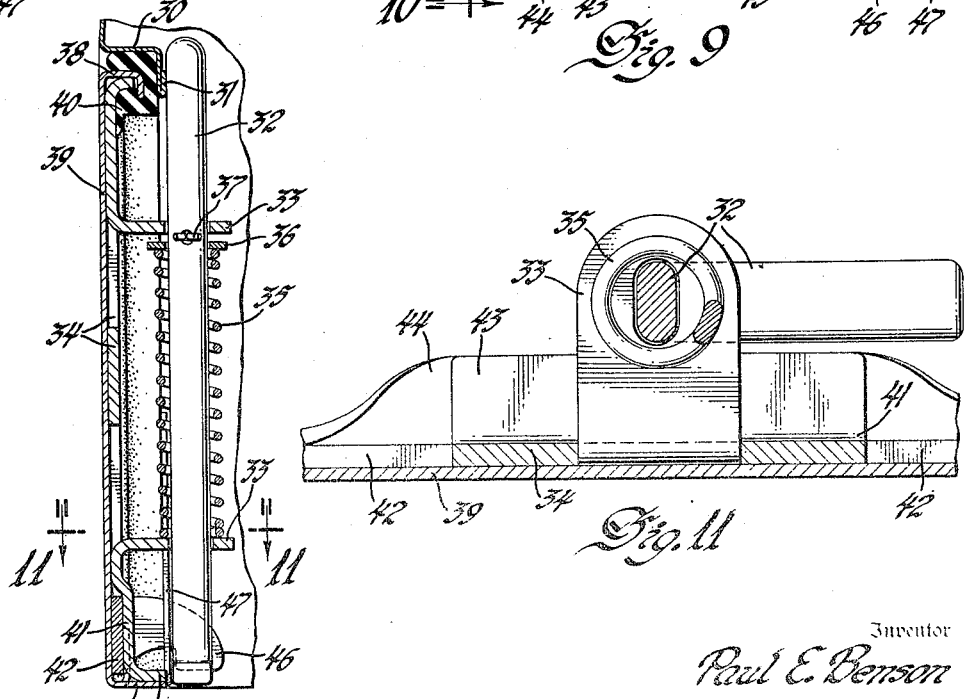
Inventor
Paul E. Benson
By
Spencer, Willits, Helwig & Baillie
Attorneys Patented Mar. 6, 1951

2,544,129

UNITED STATES PATENT OFFICE 2,544,129

WHEEL COVER

Paul E. Benson, Eaton Rapids, Mich., assignor to General Motors Corporation, Detroit, Mich., a corporation of Delaware Application June 25, 1947, Serial No. 756,939

6 Claims. (Cl. 280—153)

Appearance factors have directed an automobile fender design trend toward more fully enclosed road wheels and the current practice is to minimize the size of the wheel access opening and to cover the opening with a removable panel shield which merges into the over-all fender appearance and enables the wheels to be changed upon shield detachment.

An object of the present invention is to provide an improved fender and shield arrangement which will be more simple, less expensive and rugged in use with the parts fitted together and stiffened for the elimination of concentrated stress and for increased sturdiness.

When lifting jacks were applied to the axle the wheel access opening in the fender side wall had to be of larger diameter than the wheel to enable wheel removal. By the use of jacks, which first lift the chassis supporting parts, the wheel opening may be much smaller in the vertical direction to more completely hood the wheel with the fender side wall in the upper region of the opening extending substantially below the top of the wheel. This would leave a long but vertically narrow gap in the fender side wall which, however, can be closed by a narrow cover panel if the panel is made removable and by keeping the line of separation comparatively inconspicuous there will be afforded the pleasing appearance of a wheel fender having a straight lower edge considerably below the wheel center and close to and parallel with the ground line.

Because of increased fender sheet metal area it is desirable that the fender and shield be formed for mutual reinforcement and stiffness and this can be accomplished in part by setting the shield flush with and into the fender side wall thereby also reducing the apparentness of functional separability. Further in the interest of stiffness the fender edge defining the wheel opening may be inwardly flanged and shaped to form incidentally an inset locating shoulder for the shield and the flange itself can be further strengthened at shield attachment points by the securing thereto of additional stiffening members made so as to cooperate with cover shield stiffening elements. The strength of the shield will lie largely in the use of a relatively heavy bar hooking into the lower flange stiffeners and spanning the wheel opening at the lower end of the fender for supporting the relatively thin sheet metal panel by securement along the bottom panel edge. To supplement the bottom bar use is made of a retractible spring pressed plunger rod to latch into a stiffened fender flange portion near the top of the wheel opening and which rod is nonrotatably mounted in spaced ears conveniently struck out from a wide reinforcement plate secured centrally on the back of the sheet metal panel and at the top and bottom thereof.

Figure 5:
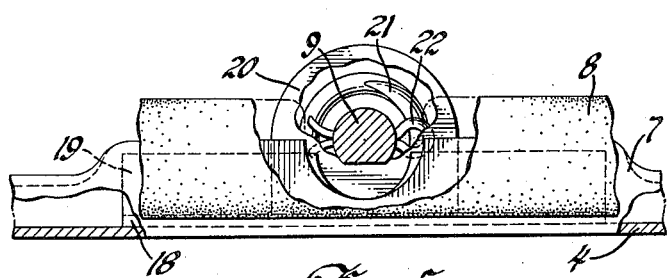
Figure 6:
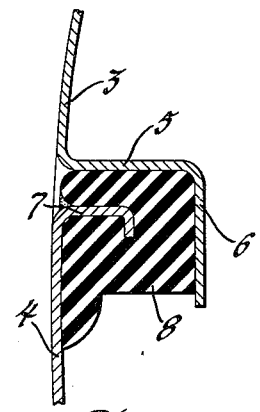
Figure 7:
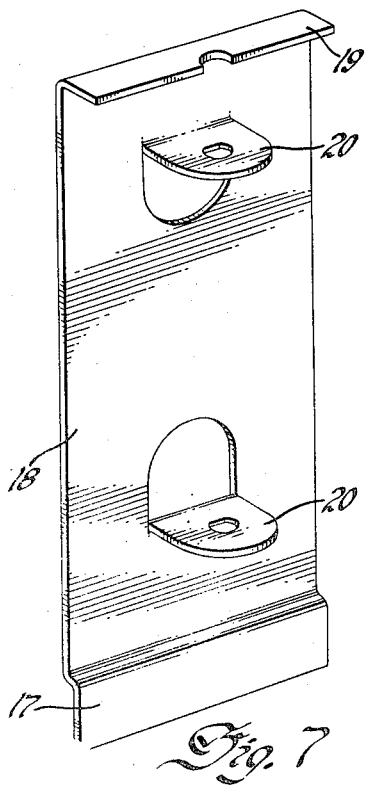
Figure 8:
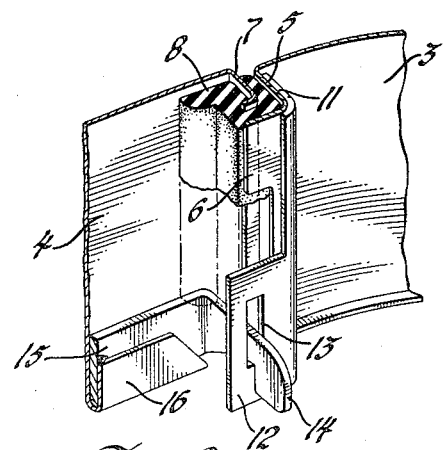

The structure thus referred to will be further described in detail with reference to its novel features in the following specification as applied to the accompanying drawing wherein Figure 1 is a side elevation of a rear portion of a motor vehicle embodying the structure; Figure 2 is an enlarged vertical section, as on line 2—2 of Figure 1; Figure 3 is an elevation showing portions of the fender and shield with parts in section; Figure 4 is a horizontal section on line 4—4 of Figure 1; Figure 5 is an enlarged detail section, as on line 5—5 of Figure 2; Figure 6 is a vertical section on line 6—6 of Figure 3; Figure 7 is a perspective view of the central panel stiffening and latch mounting plate; Figure 8 is a perspective view with parts in section to show the detachable mounting at the bottom of the fender skirt; Figure 9 is an elevation viewed from the inside of the wheel enclosure and shows a modified closure structure; Figure 10 is a vertical section on line 10—10 of Figure 9 and Figure 11 is a detail horizontal section on line 11—11 of Figure 10.

In the drawing the reference numeral 1 indicates the usual automobile body to be spring suspended on road wheels 2 housed within a well at the side of the body and an outer mud guard or sheet metal fender 3, whose lower edge is cut out to form a wheel access opening closed by a cover panel 4 removably secured to the side wall of the fender 3. The wheel access opening, which is of substantially the same size as the cover panel 4, is bounded across the top and on both sides by an inturned stiffening flange of substantially L-shape in section. Thus the flange includes a laterally extending portion 5 and an inwardly extending or vertically disposed terminal portion 6 which cooperate in affording an inwardly offset locating shoulder for an inturned and substantially L-sectioned flange 7 defining the top and side margins of the shield 4. A beading 8, of rubber or the like, is snapped onto the flange 7 in order to seat tightly against the fender flanges 5 and 6 and serves as a tight seal and as an antirattle when the parts are fitted together. Near its central top portion both the flange 7 and the rubber beading 8 are provided with a cut out portion for the passage therethrough of the upper end of a plunger latching rod 9 which projects through an aperture in the stiffening flange 5 and an aligned aperture in a stiffening washer or plate 10 welded or otherwise secured on the upper surface of the flange 5.

The flange 5 is further stiffened at each side and near the bottom thereof by having welded thereto one leg 11 of an angle bracket which extends throughout about half the height of the opening and whose other leg 12 projects laterally beside the flange 6 and beyond the same into the wheel opening where it is provided with a slot 13 for the removable reception of a locking hook 14 forming a part of the supporting panel assembly. The supporting hooks 14 are lateral extensions at opposite ends of a lower stiffening bar 15 which bridges the wheel opening and is received within a channel formed by reversely bending the lower edge portion 16 of the cover panel 4 and welding the same to the supporting bar 15.

Also welded on the back of the assembly and to the supporting bar 15 is the lower offset edge 17 of a centrally disposed sheet metal plate 18 which extends vertically across the panel 4 and at its upper end carries an inturned flange 19 to fit against and to be secured by welding to the inturned flange 7 at the top of the panel. In the central region of the plate 18 a pair of spaced tongues or ears 20 are punched laterally therefrom and are provided with apertures to receive the plunger rod 9. These apertures and the plunger rod in the regions fitted thereto are formed with at least one flat side so that the fit of the parts precludes relative rotation while enabling the free sliding movement of the rod. The nonrotative mounting or keying of the slidable rod to the mounting ears may be easily and conveniently accomplished by using a round rod which has a flat formed on one side so that the cross section is substantially D-shape, as best seen in Figure 5, and the apertures in the ears 20 correspondingly are of D-shape. Between the ears a coil spring 21 surrounds the rod and has one end seated against the lowermost ear and its opposite end seated against a cotter pin 22 projecting through a diametrical hole in the rod 9 or other similar limit stop which in turn seats against the upper ear 20 to limit the extent of upward projection of the plunger rod 9. Retraction of the rod against the spring 21 is effected manually by means of the handle or laterally bent lower end portion 23 which extends beside the lower edge of the panel assembly. The non-swingable handle 23 is within convenient grasp of the hand but in addition it is so located in relation to the reinforced lower edge of the shield so that it may be easily engaged by a separable pry bar, such as a jack handle or a tire iron brought to bear or fulcrumed on the bottom edge of the panel assembly in the event ice, snow or other accumulation on the inside of the cover requires more than a direct pull to free the latch. Once the latch has been retracted the panel can be swung outwardly at its upper end and the lower supporting hooks lifted from the supporting bracket, as indicated in broken lines in Figure 2. After access to the wheel has been had the replacement of the panel can be easily accomplished by inserting the hooks 14 in the brackets and tilting the upper end of the panel inwardly along with the manipulation of the handle 23 for latching the upper portion of the shield to the fender.

In the modified embodiment shown in Figures 9, 10 and 11 the latch rod is positioned farther inwardly from the cover shield for somewhat better assembly in that there is eliminated the removal of the material from the top of the shield flanges, the rubber sealing strip and the inturned fender flange, which in the construction heretofore described, were provided for the purpose of clearing and receiving the upper end of the latch rod. The arrangement simplifies manufacturing operations and affords reliable welded connections.

Instead of punching a hole in the fender flange and then welding a separate reinforcement washer around the hole the vertical leg of the shouldered fender flange 30 has a central portion bent back upon itself as at 31 to be engaged by the upper end of the spring pressed latch bar 32. The latch bar 32 is made from flat rod stock of substantially rectangular section, as best seen in Figure 11, and is nonrotatably slidable in similarly shaped openings in the supporting ears 33—33 punched from the central stiffener plate 34. A coil spring 35 surrounding the latch rod seats at its lower end against the bottom guide ear 33 and at its upper end against a washer 36 held on the rod by a cotter pin 37. At its upper end the plate 34 is flanged inwardly to fit within, and if desired to be welded to, the angle section marginal flange 38 of the cover panel 39 and which flange mounts the rubber strip 40. At its bottom the central stiffening plate 34 is inwardly offset at 41 to extend behind the bottom bar 42 and terminates in a lateral flange 43 welded to the bottom laterally extending flange 44 of the cover panel 39. Beyond the plate 34 the bottom flange 44 is turned upwardly against the inner face of the bottom bar 42 and to which it is spot welded at several places, as indicated at 45. Opposite ends of the bar 42 are bent inwardly and formed into mounting hooks 46 for engagement with supporting brackets 47 carried by the fender.

I claim:

1. In a motor vehicle having a wheel fender provided with a wheel access opening along its lower edge defined by an inwardly offset cover locating flange, attachment brackets separately formed of heavier stock than that of the fender and secured in backing relation with the fender flange at the bottom of the fender and projected laterally beyond said flange into said wheel access opening, a cover panel for the opening arranged to be set flush with the fender side wall and fitted at its edges to said locating flange, a panel supporting and shock resisting strap of U-shape arranged with its base set on edge in a plane parallel to the plane of the panel and secured flat on the back of the panel across the bottom thereof in bridging relation to the wheel opening and with both integral end arms projected inwardly for cooperative demountable engagement with said fender flange stiffening brackets and a spring pressed retractible plunger slidably and nonrotatably mounted on the back and centrally of the cover panel, said plunger extending vertically and terminating at its upper end in an integral portion for latching engagement with a central top portion of said offset fender flange and at its lower end in a laterally projecting handle adjacent the lower edge of the cover panel.

2. In a fender cover, a closure panel of relatively thin material having its lower edge reversely bent upon itself to channel shape, a stiffener strip set on edge and located within the channeled lower panel edge and provided with laterally bent attachment ears at opposite ends for removably supporting the closure panel, a vertical stiffening and mounting plate centrally located on the back of the closure panel and secured at its lower end to said strap and at its upper end to the top of the panel and a retractible latching plunger slidably secured in said plate to engage at its upper end with the fender and terminating at its lower end in a laterally bent portion to provide an operating handle near the bottom of the panel.

3. A fender having a wheel opening with an inset flanged margin, a cover to fit said flanged margin, attachment parts comprising interengageable stiffeners for the panel and said flanged margin, respectively, and formed separately therefrom and of heavier gauge material, one thereof being a hook formation and the other a hook receiving formation, the stiffener for the flanged margin including an angle section having one leg projected beside and secured in flat contact with a portion of the flanged margin and its other leg projected laterally beyond the flanged margin and into the wheel opening space to locate therein its formation which interengages with the cooperating formation on the panel stiffener.

4. In a fender closure for the wheel opening, a cover panel, a stiffener bar secured face to face to the panel with its lower edge bordering the lower edge of the panel, means associated with the stiffener bar for supporting the bar and the panel detachably on a fender, a spring pressed retractible plunger rod extending between the top and bottom of the panel for latching engagement at its top with a fender, said rod at its lower end terminating in a handle downwardly spaced from said panel edge as to provide a gap for insertion of a separable lever engageable with the handle to operate the same as the lever is fulcrumed on the bar stiffened lower panel edge.

5. In combination, a wheel fender having an inset flange at the margin of the wheel opening; a removable cover for the opening fitted to said flange, a latch rod carried on the back of the cover to retractibly engage at its upper end with said flange, a portion of the flange in the region of latch engagement being reversely bent back flat upon itself to double the thickness thereof as a bearing for the latch rod, and a latch supporting plate having vertically spaced apertured ears punched therefrom and projected laterally to slidably receive said retractible latch rod and having a flanged upper end housed within a channeled marginal portion of the cover and terminating at its lower end in a lateral flange fixedly secured to a bottom flange of the cover.

6. Means to cover the wheel access opening along the bottom side of a wheel fender, including a relatively heavy strap set on edge vertically and of a length to bridge the wheel opening across the bottom, said strap terminating at opposite ends in rigid trunnion projections for detachable hinged support on a longitudinal axis by fender carried brackets, a centrally disposed upstanding plate secured at its lower edge to said strap and formed intermediate its ends with a pair of spaced ears for slidably mounting a retractible plunger whose upper end is latchably engageable with the fender at the central top portion of the opening, and a relatively light gauge cover panel having its lower edge reversely bent to form a strap receiving channel and secured by welding to the back of the strap and having an inturned marginal flange at the top thereof secured to the upper end of said upstanding plunger mounting plate.

PAUL E. BENSON.

REFERENCES CITED

The following references are of record in the file of this patent:

UNITED STATES PATENTS

| Number | Name | Date |
|---|---|---|
| 1,098,307 | Webb et al. | May 26, 1914 |
| 1,570,135 | Emmert | Jan. 19, 1926 |
| 1,593,011 | Bourgon | July 20, 1926 |
| 2,161,161 | Harroun | June 6, 1939 |
| 2,202,904 | Fergueson | June 4, 1940 |
| 2,226,857 | Fergueson | Dec. 31, 1940 |
| 2,312,536 | Fergueson | Mar. 2, 1943 |
| 2,334,867 | Fergueson | Nov. 23, 1943 |
| 2,353,553 | Fergueson | July 11, 1944 |